US009261864B2

(12) United States Patent
Dzafic

(10) Patent No.: US 9,261,864 B2
(45) Date of Patent: Feb. 16, 2016

(54) METHOD AND DEVICE FOR PRODUCING A STATE SIGNAL

(75) Inventor: Izudin Dzafic, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 479 days.

(21) Appl. No.: 13/879,452

(22) PCT Filed: Oct. 14, 2010

(86) PCT No.: PCT/EP2010/065429
§ 371 (c)(1),
(2), (4) Date: May 15, 2013

(87) PCT Pub. No.: WO2012/048746
PCT Pub. Date: Apr. 19, 2012

(65) Prior Publication Data
US 2014/0074305 A1    Mar. 13, 2014

(51) Int. Cl.
*H02J 3/00*         (2006.01)
*G01R 21/133*    (2006.01)
(Continued)

(52) U.S. Cl.
CPC ............... *G05B 13/04* (2013.01); *H02J 3/008* (2013.01); *H02J 13/0013* (2013.01);
(Continued)

(58) Field of Classification Search
CPC ............ H02J 13/0013; H02J 2003/003; H02J 2003/007; G05B 13/04; Y04S 40/12; Y04S 40/22; Y04S 10/54; Y02E 60/7807; Y02E 60/76
See application file for complete search history.

(56) References Cited

U.S. PATENT DOCUMENTS

| 7,069,159 B2 | 6/2006 | Zima et al. |
| 2003/0055676 A1 | 3/2003 | Huneycutt |

(Continued)

FOREIGN PATENT DOCUMENTS

| CN | 1427520 A | 7/2003 |
| CN | 101291061 A | 10/2008 |

(Continued)

OTHER PUBLICATIONS

Billinton et al., "A Test System for Teaching Overall Power System Reliability Assessment", Nov. 1996, IEEE Transactions on Power Systems vol. 11, No. 4.*

(Continued)

*Primary Examiner* — Kenneth M Lo
*Assistant Examiner* — Sunray R Chang
(74) *Attorney, Agent, or Firm* — Laurence Greenberg; Werner Stemer; Ralph Locher

(57) ABSTRACT

A state signal is produced that indicates a state of an energy transmission system. In the method, for pre-determined network nodes of the energy transmission system, electrical measuring values for at least one electrical measuring variable are measured and used to produce the state signal indicating the state. Respectively predicted load data that predict the electrical behavior of the respective load are associated with the electrical loads connected to the energy transmission system. The electrical loads are respectively associated with an electrical load group into which the electrical loads are collected with comparable prognostic reliability. An individual weighting value that describes the prognosis reliability of the predicted load data of the loads associated with the load group is respectively allocated to each load group. The state signal is formed using the measuring values, the load data and the weighting values.

9 Claims, 7 Drawing Sheets

(51) Int. Cl.
*G05B 13/04* (2006.01)
*H02J 13/00* (2006.01)

(52) U.S. Cl.
CPC ..... *H02J 2003/003* (2013.01); *H02J 2003/007* (2013.01); *Y02E 60/76* (2013.01); *Y02E 60/7807* (2013.01); *Y04S 10/54* (2013.01); *Y04S 40/12* (2013.01); *Y04S 40/22* (2013.01)

(56) References Cited

U.S. PATENT DOCUMENTS

| | | | | |
|---|---|---|---|---|
| 2006/0111860 | A1* | 5/2006 | Trias | H02J 3/00 702/85 |
| 2009/0083019 | A1* | 3/2009 | Nasle | G06F 17/509 703/18 |
| 2009/0083049 | A1* | 3/2009 | Sciarrino | G06Q 10/101 705/300 |
| 2009/0287520 | A1* | 11/2009 | Zimmerman | G06Q 10/04 705/7.37 |
| 2010/0217550 | A1* | 8/2010 | Crabtree | H02J 13/0079 702/62 |
| 2010/0218550 | A1* | 9/2010 | Yoshioka | F25B 43/006 62/503 |

FOREIGN PATENT DOCUMENTS

| | | |
|---|---|---|
| CN | 101819243 A | 9/2010 |
| EP | 1 418 477 A1 | 5/2004 |
| EP | 1 729 223 A2 | 12/2006 |
| WO | 03/025701 A2 | 3/2003 |

OTHER PUBLICATIONS

Chassin et al., "Evaluating North American electric grid reliability using the Baraba' si-Albert network model", 2005, Science Direct Physica A 355.*

Lu et al. "Multivariate performance reliability prediction in real-time", Oct. 2000, Reliability Engineering & system Safety, 72 2001.*

Tang et al., "Reliability Prediction Using Nondestructuve Accelerated-Degradation Data", Dec. 1995, IEEE Transaction on Reliability, vol. 44, No. 4.*

* cited by examiner

METHOD AND DEVICE FOR PRODUCING A STATE SIGNAL

BACKGROUND OF THE INVENTION

Field of the Invention

The invention relates to a method for producing a state signal which displays a state of an energy transmission system, wherein electrical measured values for at least one electrical measured variable are measured for predetermined network nodes of the energy transmission system and are used to produce the state signal indicating the state. The state signal, as a "state" can for example indicate a current, voltage or performance value at one of the network nodes of the energy transmission system, a measured value derived therefrom, a load estimation, a power flow or any other given variable which relates indirectly or directly to the energy transmission system. For example an alarm signal that indicates an alarm state or an error signal that indicates an error can be produced as the state signal.

In high-voltage networks measurement sensors are usually disposed at all major network nodes in order to reliably establish the respective state of the high-voltage network and enable suitable measures to be taken for example in the event of an error. By contrast with this there are not usually the corresponding number of measurement sensors in medium-voltage networks. As a rule not every network node present in the network is equipped with corresponding sensors, so that it is not known which voltages and phase angles are present at these network nodes.

BRIEF SUMMARY OF THE INVENTION

The underlying object of the invention is to specify a method with which a state signal can be quickly and reliably produced even if, as a result of the absence of measurement sensors, there are not sufficient real measured values available.

This object is achieved in accordance with the invention by a method with the features as claimed. Advantageous embodiments of the inventive method are specified in the dependent claims.

There is thus provision, in accordance with the invention for the electrical loads connected to the energy transmission system to each be assigned predicted load data which predict the electrical behavior of the respective load, which is assigned to electrical loads of an electronic load group in each case in which electrical loads can be grouped together with comparable prediction reliability, for each load group to be allocated an individual weighting value in each case which describes the prediction reliability of the predicted load data, and for the state signal to be formed using the load data as well as the weighting values of the load groups.

A significant advantage of the inventive method lies in the fact that this method is able to be performed relatively quickly—for example with an electronic data processing system. In accordance with the invention the loads taken into consideration in the method are namely grouped together and load groups are formed the loads of which have a comparable prediction reliability. A load group can for example be formed by industrial loads: Industrial loads normally exhibit a very reliable load behavior, since this is determined by operational execution sequences. Another load group can for example be formed by normal customers, whose consumption behavior can generally not be predicted as reliably as that of industry. By grouping the loads together into load groups and taking into account weighting values for individual load groups a substantial increase in speed can be achieved compared to use of weighting values for individual loads.

Preferably load groups are made available for electrical loads for which in each case at least one measured consumption value of at least one energy consumption measurement device is available, and also for other load groups for electrical loads for which no measured consumption value is available. In the assignment of the electrical loads to one of the load groups account is preferably taken of both the prediction reliability and also the presence of a measured consumption value.

It is also seen as advantageous if at least one current measured climate value is measured and the weighting values and/or the load data is corrected by including the current measured climate value. A correction is undertaken for example if the climate measurement value currently being measured deviates from a predetermined required climate value.

Simulated measurement variables can also be computed for example for network nodes of the energy transmission system and the state of the energy transmission system can be checked with the inclusion of the simulated measurement variables. For network nodes for which no electrical measured values are available for example, simulated measurement variables can be computed. In other words within the framework of the method of operating the energy transmission system, by including the electrical measured values, the predicted load data and the weighting values can also be "simulated".

In accordance with another variant of the method there can be provision for simulated measurement variables to be computed for the predetermined network nodes for which electrical measured values are present, for the simulated measurement variables to be compared with the measured values and for optimized load data to be formed by the predicted load data being varied until the deviation between the simulated measurement variables and the electronic measured values becomes minimal or until the value reaches or falls below a predetermined threshold.

In such cases the weighting values assigned to the respective load group can be taken into account when varying the load data, in that its load data for which the weighting values indicate a smaller prediction reliability can be varied over a greater range than load data of which the weighting value indicates a greater prediction reliability.

The invention also relates to a device for producing a state signal which indicates the state of an energy transmission system. Inventively the device is equipped with an interface for entry of electrical measured values which are measured for predetermined network nodes of the energy transmission system for at least one electrical measured value, a control device which is suitable for forming load groups, assigning loads to the load groups and allocating to the load groups in each case an individual weighting value which describes the prediction reliability of predicted load data of the loads assigned to the load group, and producing the state of the energy transmission system by including the measured values, checking the load data and also the weighting values and producing a state signal indicating the state.

BRIEF DESCRIPTION OF THE SEVERAL VIEWS OF THE DRAWING

The invention is explained in greater detail below on the basis of exemplary embodiments, in which, by way of example.

DESCRIPTION OF THE INVENTION

Figure 1:
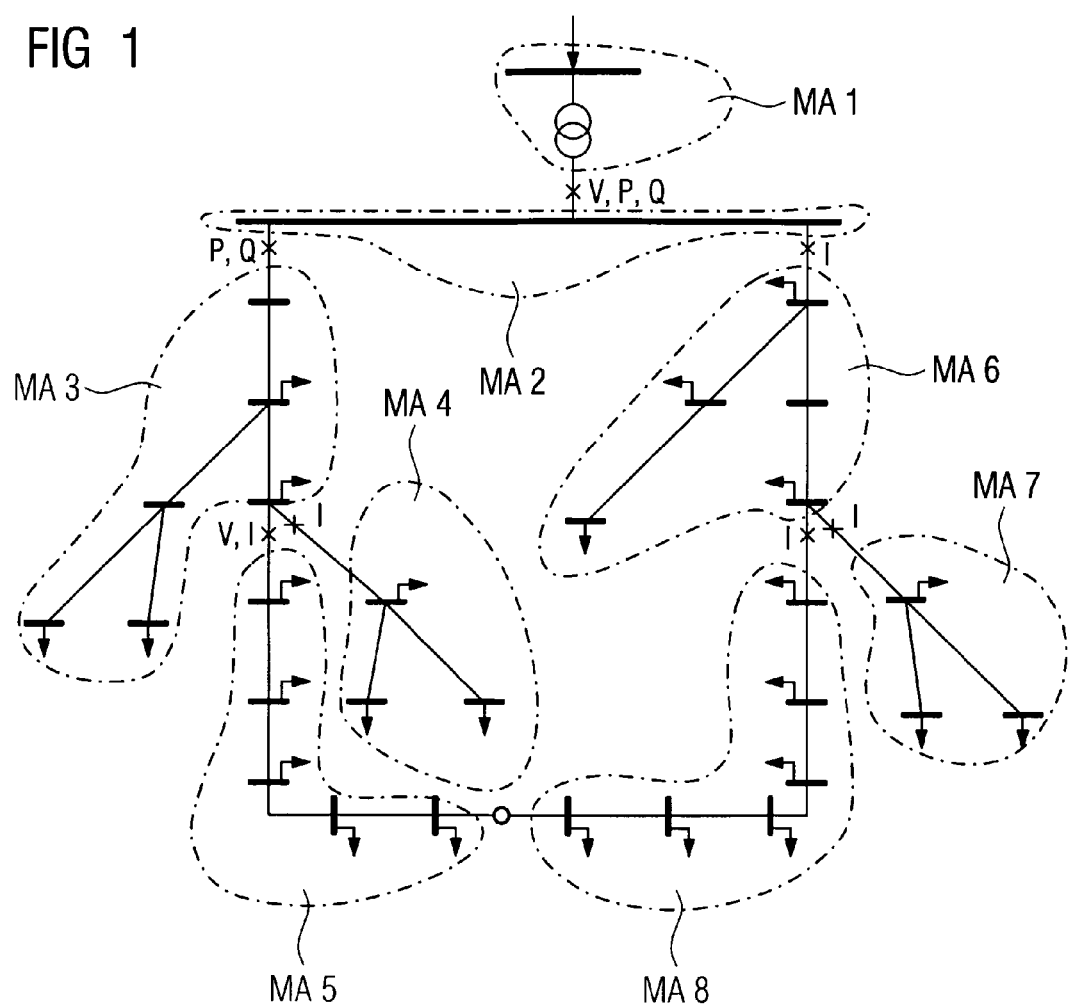
FIG. 1 shows an exemplary embodiment for an energy transmission system with a plurality of measurement sections.

For reasons of clarity the same reference characters are always used for identical or comparable elements in the figures.

Radial or tree-like feed-in structures are typically employed in energy transmission systems of medium-voltage networks, for example in the form of loops which are operated as open rings. In these energy supply systems electrical measuring devices are only present at the feed-in points, but as a rule not at each network node of the energy transmission systems. In other words only a small number of network nodes of the energy transmission systems are equipped with electrical measuring devices. The measuring devices involved are for example current or voltage measurement devices or power measurement devices, which can measure the effective power and/or the no-load power. Information about the loads connected to the energy transmission system is therefore not available as a rule in the form of current electrical measured values but merely in the form of predicted load data which is obtained on the basis of empirical values. The predicted load data can for example be present in the form of normalized load curves for the effective power P and the no-load power Q or in the form of normalized load curves for the effective power P and the power factor $\cos(\phi)$.

FIG. 1 for example shows an energy transmission system that is operated as an open ring. The energy transmission system is equipped with a number of electrical measurement devices through which the measurement sections MA1 to MA8 are defined; in this case each measurement section is delimited by a measurement device. In FIG. 1 measurement devices are marked by crosses and loads by arrows pointing downwards.

Since no measurement devices are present within the measurement sections, simulations must be carried out for the network nodes located therein if the electrical measured values present at the nodes are to be quantitatively determined.

One of the factors preferably taken into account for such simulations is that the measured values at the interfaces of measurement sections adjoining one another are matched in terms of their values. In particular power deviations at the interfaces of adjoining measurement sections are to be avoided. The latter condition is difficult to fulfill since usually only current measurement devices are available at many network nodes and thus information is not available for each network node about the effective power and the no-load power.

Figure 2:
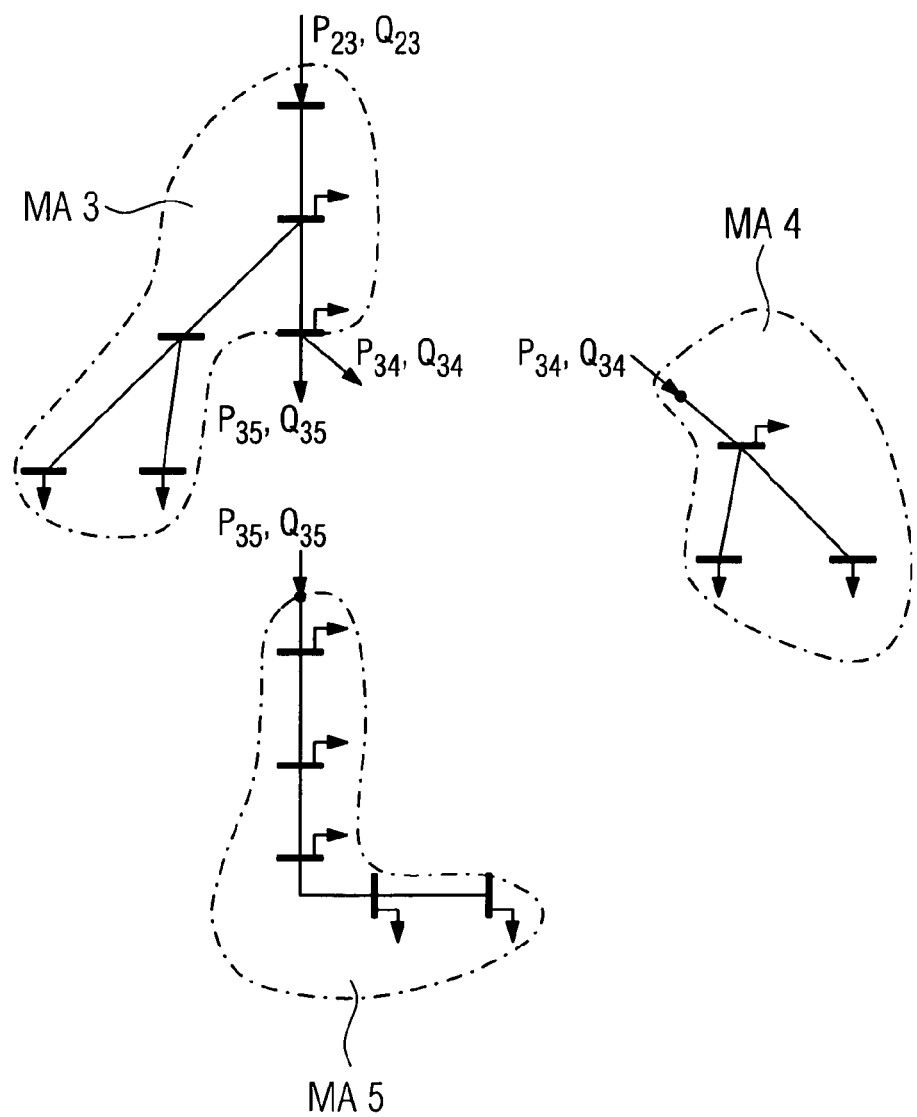
FIG. 2 shows a section of the energy transmission in accordance with FIG. 1 in detail.

FIG. 2 shows an example of how adjacent measurement sections are coupled to each other via the power flow: the power flow which flows out of one measurement section flows into the other measurement section. This fact can be utilized for an optimized estimation of the load behavior of the connected loads. Thus the coupling of adjacent measurement sections can be included for an iterative calculation in which a load flow calculation for the entire energy transmission system as well as an estimation is carried out, with which the load data is adapted and power differences at the interfaces between adjacent measurement sections are avoided.

In the estimation method described here by way of example the load data and the electrical measured values and also—if available—pseudo measured values are handled in the same way. Account is taken of the different quality of this information by using different weighting values. For example by a high weighting or a high weighting value for real or actually measured measurement values it is ensured that these are "hit" for the simulation and optimization or are not changed by the simulation and optimization. By a lower weighting or lower weighting values for pseudo measured values and predicted load data it can be ensured that these can be changed to a relatively large extent in the simulation and optimization and the simulation and/or optimization algorithms can converge computationally. An accurate handling of non-conformant loads is also possible by using weightings and weighting values, in that said loads are allocated lower weighting values than conformant loads.

In the exemplary embodiment explained here load data is used as state variables for an estimation. Electrical voltages and electrical currents are included indirectly after a power flow computation has been carried out. The estimation needs neither the structured data of the measurement sections nor their guide values. The estimation merely needs the sum of the measured loads in the different iteration steps, the losses and the loading at the boundaries of the measurement section. In this way the outlay involved in carrying out the estimation method is greatly reduced for each iteration step.

A further significant reduction of the computing outlay when carrying out the estimation method is achieved by the grouping of the loads into load groups in each measurement section. A load group consists of or comprises loads having the same information quality (prediction reliability) and the load behavior of which can be predicted with comparable reliability or accuracy. Accordingly loads of the same load group are taken into account for the estimation and simulation with the same weighting values.

For measurement sections having a complete set of effective power (P) and no-load power (Q) measurement devices, the estimation process is rather simple. The loads are determined in a manner such that they correspond to the sum of the fed-in and measured power at the respective measurement section boundary. Only the losses in the subsequent iteration processes must be taken into account.

Figure 3:
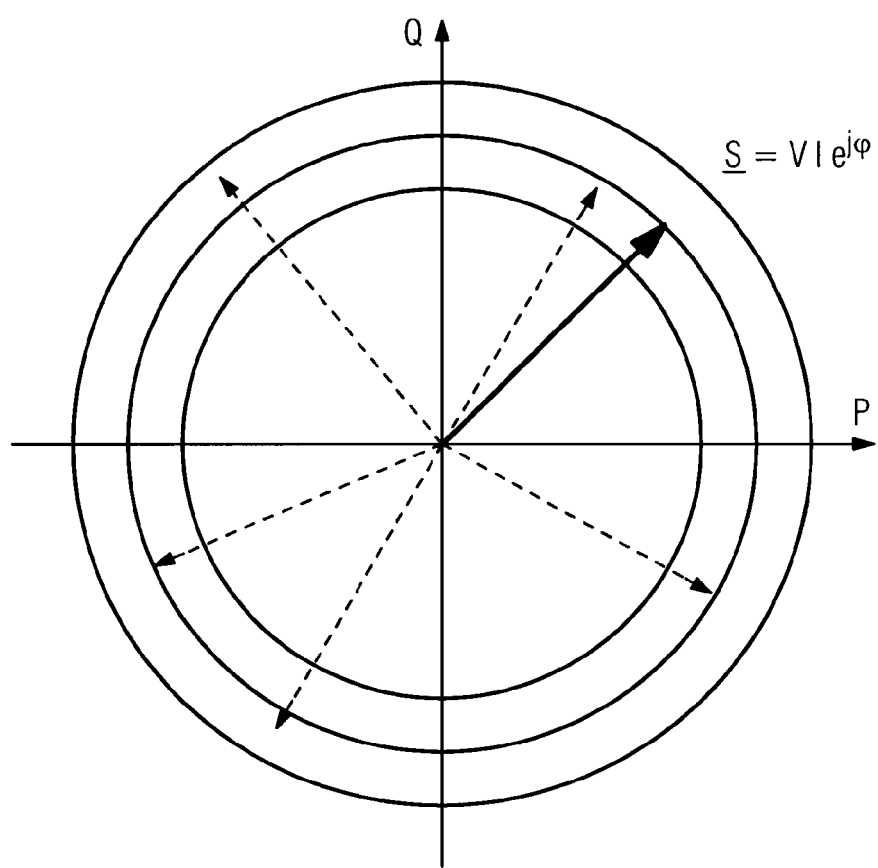
FIG. 3 shows different combinations for the complex power which is computed from measured values for current and voltage.

The calculation is more difficult for measurement sections of which the measurement section boundary is only equipped with a current measurement device. Current measurement values can namely not be used directly for the determination of the load information. FIG. 3 shows that a current measurement merely describes a ring area for the complex power. Further processing of the current measurement values thus has to be performed.

The further processing of the current measurement values for P and Q pseudo measurement values is for example performed individually for each measurement section. For each measurement section with a current measurement value at the measurement section boundary the following minimization can be carried out:

$$\sum_{i}^{NLG}\left(w_{i}^{P,LG}(P_{i}^{LG}(k_{i}^{P}-1))^{2}+w_{i}^{Q,LG}(Q_{i}^{LG}(k_{i}^{Q}-1))^{2}\right)\to\min \quad (1)$$

Wherein the following condition is included:

$$\left(\sum_{i=1}^{NLG}k_{i}^{P}P_{i}^{LG}+\Delta P\right)^{2}+\left(\sum_{i=1}^{NLG}k_{i}^{Q}Q_{i}^{LG}+\Delta Q\right)^{2}-V^{2}I_{M}^{2}=0 \quad (2)$$

Wherein the elements have the following meanings:
NLG is the number of load groups in the respective measurement section,
$P_i^{LG}, Q_i^{LG}$ are the effective and no-load power of a load group (basic load data) which are obtained from a load curve or from load data or from pseudo measurements,
$w_i^{P,LG}, w_i^{Q,LG}$ are the weighting factors for P and Q of the respective load group,
$k_i^P, k_i^Q$ are estimated measured values for P and Q of the respective load group,
ΔP,ΔQ is the sum of the losses in the respective measurement section, and is in fact the measured losses at the measurement section boundary and all losses produced internally,
V is the voltage at the measurement section boundary, obtained from the last internal power flow resolution and
$I_M$ is the measured current at the measurement section boundary.

The determined values $k_i^P P_i^{LG}$ and $k_i^Q Q_i^{LG}$ are used as new load data for the next internal power flow calculation and the next estimation step.

The conversion of the measured current values preferably begins with the measurement sections in which only one current value has to be converted.

Formulated in general terms the conversion is preferably carried out "from the bottom to the top", wherein the conversion starts with the measurement section having only one measured current value and which has not yet been calculated. Looking at the feed-in point 2 in FIG. 1, the measurement section 6 after the measurement sections 7 and 8 is thus taken into account, because this section has two network nodes with measured current values. Thus the measurement sections 7 and 8 are converted first of all. This procedure reduces the number of measured current values which have not yet been converted in measurement section 6. The number of measured current values is reduced step-by-step until all have been converted.

In the event of intermeshed structures or parallel feeding it can occur under some circumstances that not all measured current values at the measurement section boundaries of a measurement section are able to be converted in the way described. The remaining measured current values can then be handled differently, as will be explained by way of example further on in this document.

The conversion of the currents into P and Q pseudo measured values is undertaken individually for each measurement section, without taking into account coupling of the measurement sections. Couplings can be taken into account in a subsequent estimation step, which takes in the complete network.

The next step preferably forces the flow to match at the measurement section boundaries of adjacent measurement sections.

The estimation problem can be expressed as a minimization of the destination J which is described in the equation (3).

The first part of the equation (3) takes account of the fact that the differences between the measured values and the estimated power information will be minimized; the second part is responsible for the minimization of the differences in the load information. The third and fourth part take account of the differences between the measured and the estimated voltages and currents. In addition the following equality conditions must be fulfilled:

The sum of the estimated active effective power for the real measured values and the pseudo measured values and the effective power which is provided by real generators covers the effective power losses (equation (4)).

The sum of the estimated active no-load power Q for the real measured values and the pseudo measured values and the effective power which is provided by real generators and capacitances covers the no-load losses (equation (5)).

For each measurement section with pseudo measured values which have been calculated from measured current values, the estimated values $P_c^E, Q_c^E, I_c^E$ and $V_c$ must satisfy equation (3).

$$J=\min\left(\sum_{i=1}^{NPQ}\left[w_{i}^{PM}(P_{i}^{E}-P_{i}^{m})^{2}+w_{i}^{QM}(Q_{i}^{E}-Q_{i}^{m})^{2}\right]+ \right. \quad (3)$$
$$\sum_{i=1}^{NLG}\left[w_{i}^{PLG}(P_{i}^{LG}(k_{i}^{P}-1))^{2}+w_{i}^{QLG}(Q_{i}^{LG}(k_{i}^{Q}-1))^{2}\right]+$$
$$\left. \sum_{i=1}^{NI}w_{i}^{IM}(I_{i}^{E}-I_{i}^{m})^{2}+\sum_{i=1}^{NI}w_{i}^{VM}(V_{i}^{E}-V_{i}^{m})^{2}\right)$$

With the boundary conditions:

$$\sum_{i=1}^{NMK}P_{i}^{E}+\sum_{i=1}^{NGK}P_{i}^{Gen}-\sum_{i=1}^{NLGK}k_{i}^{P}P_{i}^{LG}-P_{loss}^{k}=0 \quad (4)$$

$$\sum_{i=1}^{NMK}Q_{i}^{E}+\sum_{i=1}^{NGK}Q_{i}^{Gen}+\sum_{i=1}^{NCK}Q_{i}^{Cap}-\sum_{i=1}^{NLGK}k_{i}^{Q}Q_{i}^{LG}-Q_{loss}^{k}=0 \quad (5)$$

$$(P_{c}^{E})^{2}+(Q_{c}^{E})^{2}-(v_{c}I_{c}^{E})^{2}=0 \quad (6)$$

Wherein the elements have the following meanings
NPQ is the total number of measured power values in the system, including those which have been computed from measured current values,
NLG is the total number of load groups,
NLGK is the number of load groups in the measurement section k,
NI is the total number of measured current values,
NMK is the number of P/Q measurement pairs which have been calculated from currents in the measurement section k,
NGK is the number of generators in measurement section k,
NCK is the number of capacitors in measurement section k,
$w_i^{PM}, w_i^{QM}, w_i^{IM}$ are the weighting factors for the effective power and no-load power and the measured current values,
$P_i^E, Q_i^E$ are estimated effective power and no-load power related to the ith measurement,
$I_i^E$ is estimated current related to the ith measurement,
$I_i^m$ is the measured ith current level,
$P_i^m, Q_i^m$ are measured effective power and no-load power including pseudo measured values which are derived from currents, $w_i^{P,LG}, w_i^{Q,LG}$ are weighting values for the effective power and no-load power for the ith load group, $k_i^P, k_i^Q$ are estimated scaling factors f for the power in the ith load group, $P_i^{LG}, Q_i^{LG}$ are the effective power and no-load power in the ith load group, $P_i^{Gen}, Q_i^{Gen}$ are the effective power and no-load power of the ith generator, $V_i^E$ is the estimated voltage related to the ith measurement, $V_i^m$ is the measured ith voltage, $V_c$ is the voltage which is used the power conversion, $P_{loss}^k, Q_{loss}^k$ is the power loss in the measurement section k and $P_c^E, Q_c^E, I_c^E$ are estimated results for a current which has been converted into a power.

Preferably the following approach is selected for the conversion of the currents into power and the estimation for the complete system:

$$J(x) = (x - x^M)^T W (x - x^M) \to \min \quad (7)$$

Wherein the elements have the following meanings:

$x^M$ is the vector of the measurement information (real and pseudo), $x$ is the vector of the estimated state variables and $W$ is the diagonal matrix of the weighting factors The estimation preferably takes account of all existing boundary conditions $$g_i(x) = 0, \quad (8)$$

which are defined by the equation (2) for the conversion of the currents and by the equations (4), (5) and (6) for the estimation of the entire system. The optimization problem with equality boundary conditions can be resolved by using Lagrange multipliers with a Lagrange function, as is described by the following equation:

$$L(x, \lambda) = J(x) - \sum_i^m \lambda_i g_i(x) = J(x) - \lambda^T g(x) \quad (9)$$

with $\lambda$ as a vector of the Lagrange multipliers.

In the solution the following equations must be fulfilled:

$$\nabla L(x, \lambda) = 0 \quad (10)$$

$$\frac{\partial L}{\partial x} = 0 \Rightarrow W(x_i^M - x_i) + G^T \lambda = 0 \quad (11)$$

$$\frac{\partial L}{\partial \lambda} = 0 \Rightarrow g(x) = 0 \quad (12)$$

The set of these non-linear equations is preferably resolved iteratively using the Newton-Raphson method:

$$\begin{bmatrix} W & G^T \\ G & 0 \end{bmatrix} \begin{bmatrix} \Delta x \\ -\lambda \end{bmatrix} = \begin{bmatrix} W \Delta \hat{x}^k \\ -g(x^k) \end{bmatrix} \quad (13)$$

Wherein the elements have the following meanings:

$x^k$ is the solution of the kth iteration, $x^M$ is the vector of the measurements, including the pseudo measurements, $\Delta x = x^{k+1} - x^k$ is the vector with the differences between the results of two consecutive iteration steps, $\Delta \hat{x}^k = x^M - x^k$ is the vector with the differences between the measurements and the results of the kth iteration, $$G = \frac{\partial g(x)}{\partial x}$$

is the matrix with the partial derivations of the condition vector and $\lambda$ is the vector of the Lagrange multipliers.

If two or more measured current values are present at a measurement section boundary, the conversion of the measured current values into pseudo power flow information can be carried out for example such that initially all measured current values are converted, which leads to another measurement section with only one measured current value not yet converted. In this way the number of measured currents not yet converted is reduced ever further. This method of operation is always able to be used with a radial and tree-structure-like networks.

Figure 4:
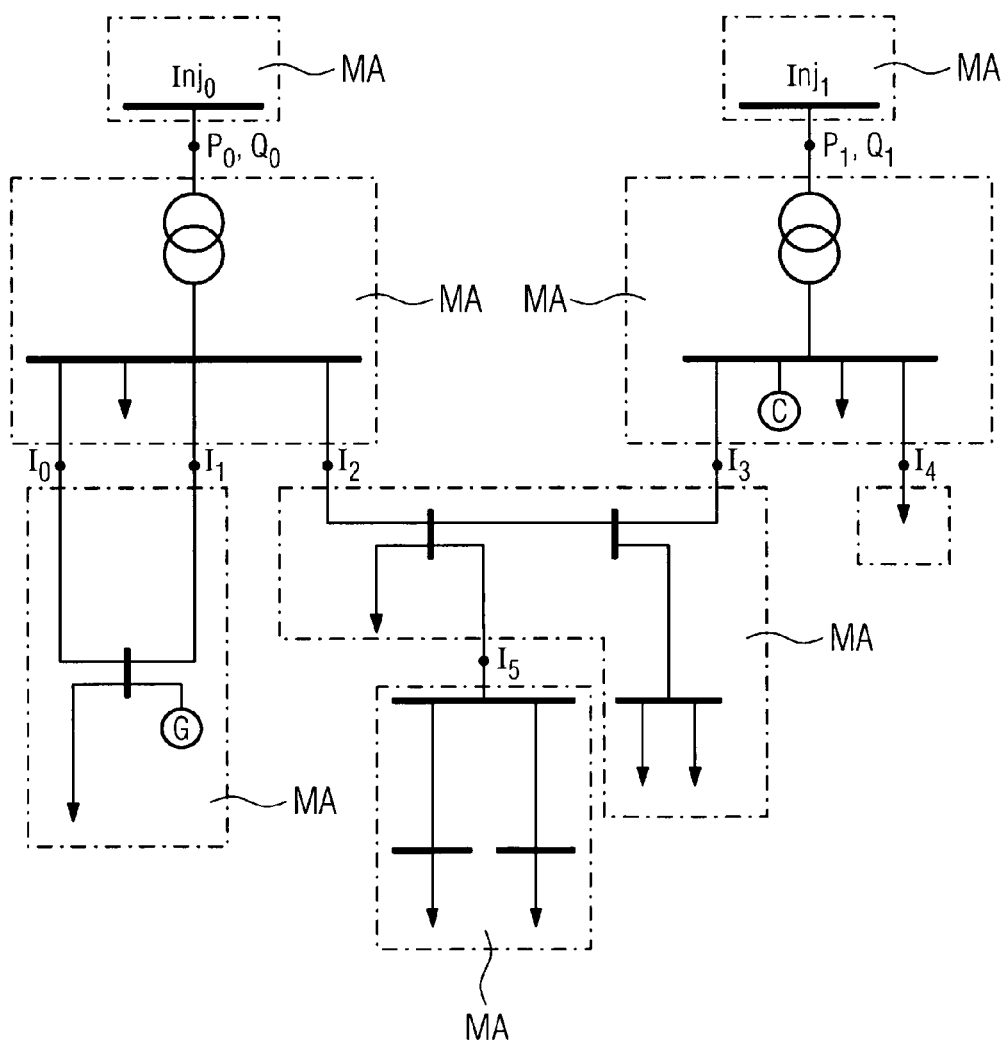
FIG. 4 shows a further exemplary embodiment for an energy transmission system with a plurality of predetermined measurement sections.

For networks with an intermeshed structure or parallel feeding, this method of operation however does not always lead to the objective. FIG. 4 shows an intermeshed topology by way of example. In FIG. 4 the measurement sections are identified with the reference characters MA, generators by a G, capacitors by a C, load groups by an arrow pointing downwards and measurement points by large black dots.

The currents I0 und I1 (looped feeding) and also I2 und I3 (parallel feeding) are preferably converted in this arrangement in a different way from that described above. For example the impedances within the loop or the coupling of the branches are taken into consideration directly in the estimation. Each branch of a section with a number of items of remaining current information can be defined as a separate measurement section, which has defined effective and no-load power values at one of its ends. These measured values can be called virtual since they have not been derived from real measured current values.

For a branch from network node i to j the complex power at the two sides can be determined in accordance with:

$$\begin{bmatrix} \underline{S}_{ij} \\ \underline{S}_{ji} \end{bmatrix} = \begin{bmatrix} \underline{V}_i & 0 \\ 0 & \underline{V}_j \end{bmatrix} \begin{bmatrix} \underline{I}_i \\ \underline{I}_j \end{bmatrix}^* = \begin{bmatrix} \underline{V}_i & 0 \\ 0 & \underline{V}_j \end{bmatrix} \left( \begin{bmatrix} \underline{Y}_{ii} & \underline{Y}_{ij} \\ \underline{Y}_{ji} & \underline{Y}_{jj} \end{bmatrix} \begin{bmatrix} \underline{V}_i \\ \underline{V}_j \end{bmatrix} \right)^*$$

Wherein the elements have the following meanings:

$\underline{V}_i, \underline{V}_j$ is the complex voltage at node i and at node j, $\underline{S}_{nm}$ is the complex power of nodes n to nodes m with n,m∈[i,j] and $\underline{Y}_{nm}$ are the parameters of the branch with n,m∈[i,j], The power information is extracted from the preceding load flow computation and is used again as the measured value with a small weighting value (weighting factor).

The virtual power measurement values are preferably calculated only for the sides of the branches which are connected to a node inside the intermeshed network. No computation is carried out if real power measurement values are available for the branch sides.

Figure 5:
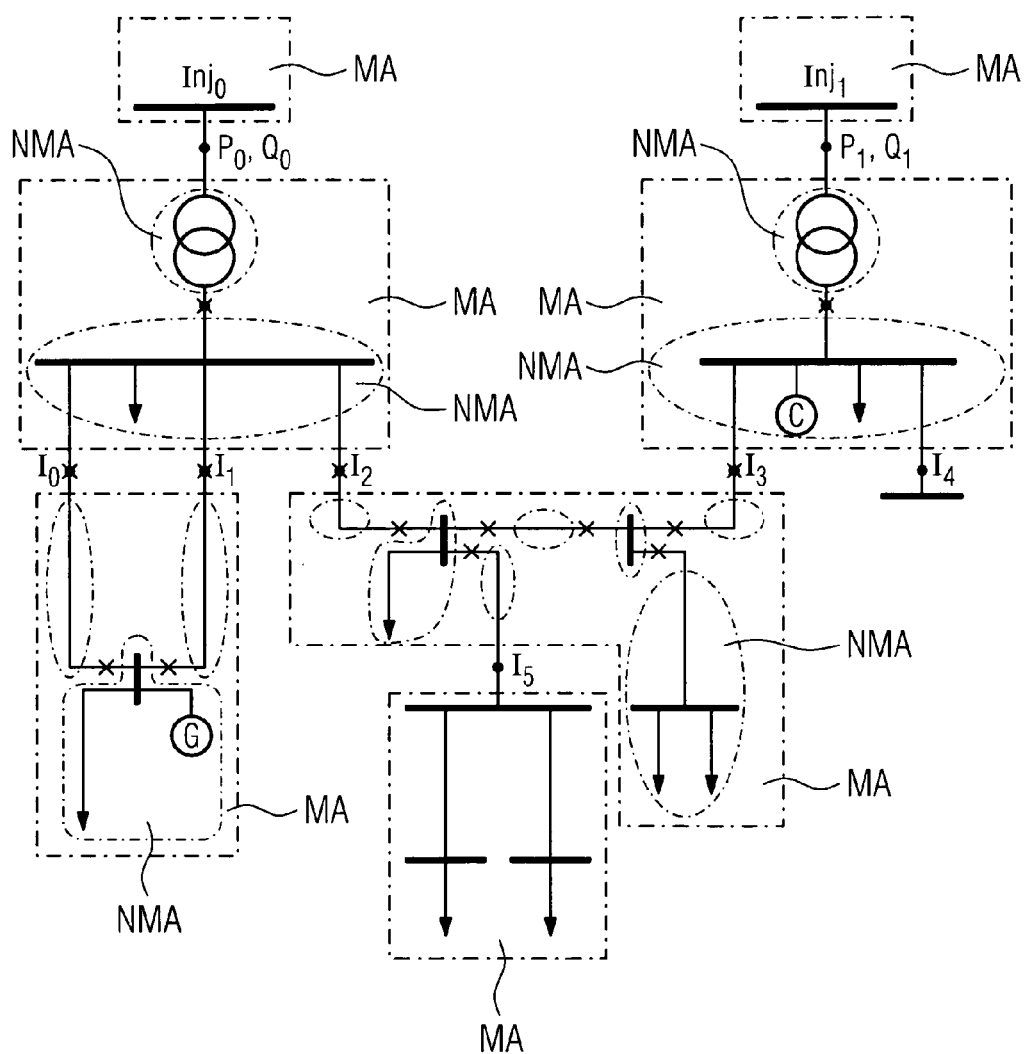
FIG. 5 shows the exemplary embodiment in accordance with FIG. 4 after a redefinition of the measurement sections.

FIG. 5 shows the network in accordance with FIG. 4 with the newly-formed measurement sections and the corresponding virtual measurement values. The newly-formed measurement sections which do not contain any branches can also be called virtual node areas. In FIG. 5 the original measurement sections are labeled with the reference characters MA, the newly formed measurement sections are labeled with the reference characters NMA, generators by a G, capacitances by a C, load groups by an arrow pointing downwards, real measurement points by a large black dot, virtual P and Q measurement points by a cross and measurement points for which measured current values will be converted into virtual P and Q values by a dot with a cross through it.

The target of the equations (3) to (6), which is used for the optimization process, can be supplemented by the additional virtual information in accordance with $$J' = \min\left(J + \sum_{i=1}^{NVNA} (w_{Vi}^{NVNA}(V_i^{E,VN} - V_i^{c,VN})) + \sum_{i=1}^{NVNA} (w_{\varphi i}^{NVNA}(\varphi_i^{E,VN} - \varphi_i^{c,VN}))\right)$$

Wherein the elements have the following meanings:
J is the target in accordance with equations (3) to (6),
J' is the expanded target,
NVNA is the number of virtual node areas,
$V_i^{E,VN}, \theta_i^{E,VN}$ are the voltage and the phase angle in the virtual node area estimated with a WLS algorithm and
$V_i^{c,VN}, \theta_i^{c,VN}$ are the voltage and the phase angle in the virtual node area calculated according to power flow.

The virtual node areas must fulfill Kirchhoff's first law:

$$\sum_{i=1}^{NLDk} P_i^{Ek} + \sum_{i=1}^{NBRk} P_i^{E,Brk} = 0$$

$$\sum_{i=1}^{NLDk} Q_i^{Ek} + \sum_{i=1}^{NBRk} Q_i^{E,Brk} = 0$$

Wherein the elements have the following meanings:
NLDk is the number of loads which are connected to the virtual node area k,
NBRk is the number of branches which are connected to the virtual load area k,
$P_i^{Ek}, Q_i^{Ek}$ is the estimated load i which is connected to the virtual load area k, and
$P_i^{E,Brk}, Q_i^{E,Brk}$ are the estimated flows through branch i, which is connected to the virtual node area k.

The additional boundary conditions are taken into account in the equations (4) and (5) as well. The virtual power measurements can thus be taken into account during the estimation in the same way as the real power measurements, only a lower weighting has to be taken into account. The virtual power measurements can be determined by the load flow calculation which can precede the estimation.

Figure 6:
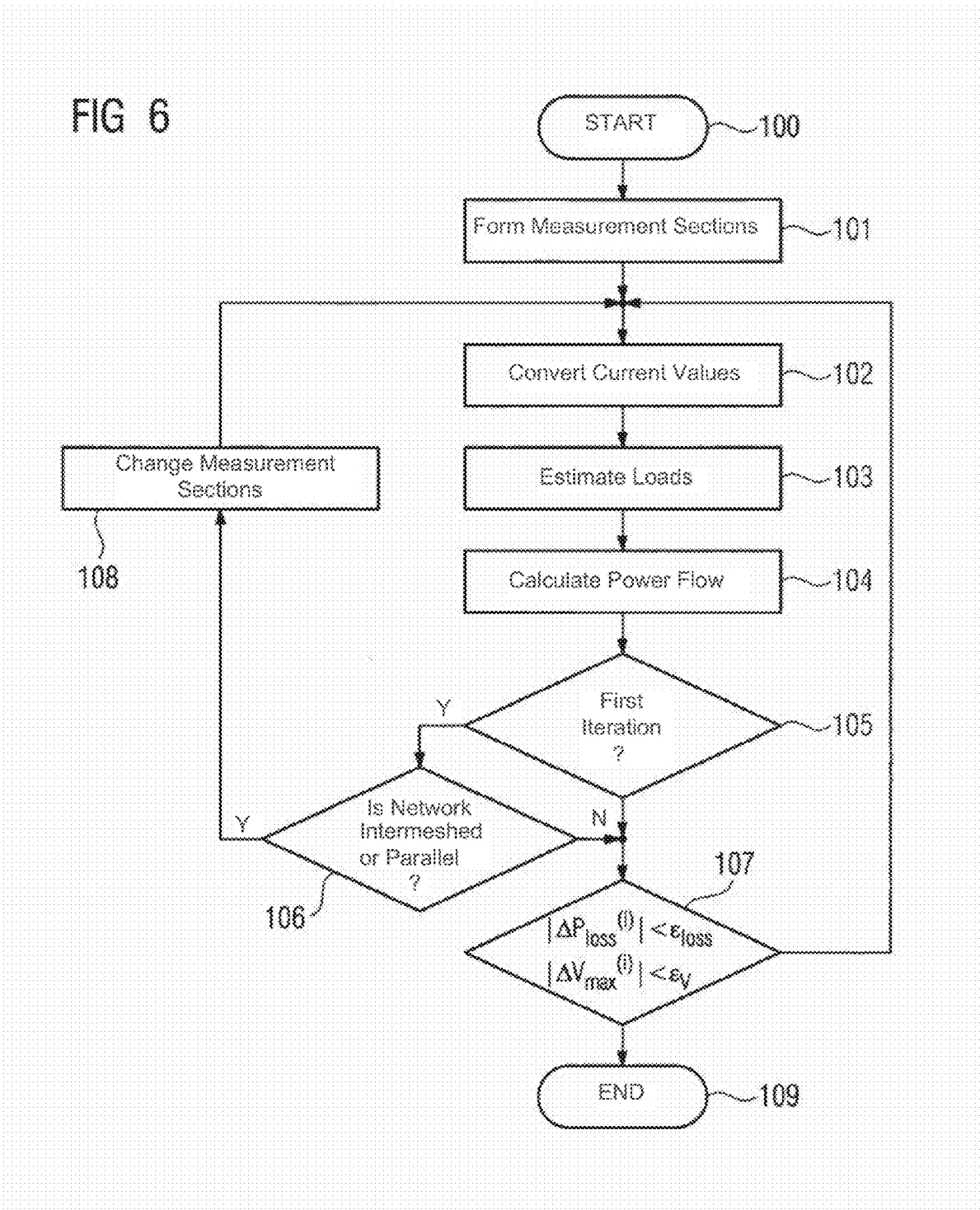
FIG. 6 shows a flow diagram to explain an exemplary embodiment of the inventive method and FIG. 7 shows a further exemplary embodiment for an arrangement for carrying out the inventive method.

FIG. 6 shows a flow diagram for the exemplary embodiment of an estimation process. The process is started in step 100. In step 101 the measurement sections are formed. In step 102 measured current values are converted into P and Q values "from bottom to top". In step 103 the loads are estimated. In Step 104 the power flow is calculated. In step 105 a check is performed as to whether this is the first iteration step. If it is, the process branches to step 106 and if it is not the process branches to step 107.

In step 106 a check is performed as to whether the network involved is an intermeshed network or a network with parallel feeding. If it is, then in step 108 the measurement sections are changed and the process continues with step 102. Otherwise the process branches to step 107.

In step 107 the interrogation described in FIG. 6 is carried out: A check is made as to whether the difference between the determined power loss $P_{loss}$ for consecutive iteration steps is smaller than a predetermined threshold value $\epsilon_{loss}$ and whether a difference between the voltage determined $V_{max}$ for consecutive iteration steps is smaller than a predetermined threshold value $\epsilon_V$. If both conditions are fulfilled the method is ended (step 109). Otherwise there is further optimization by returning to step 102.

Figure 7:
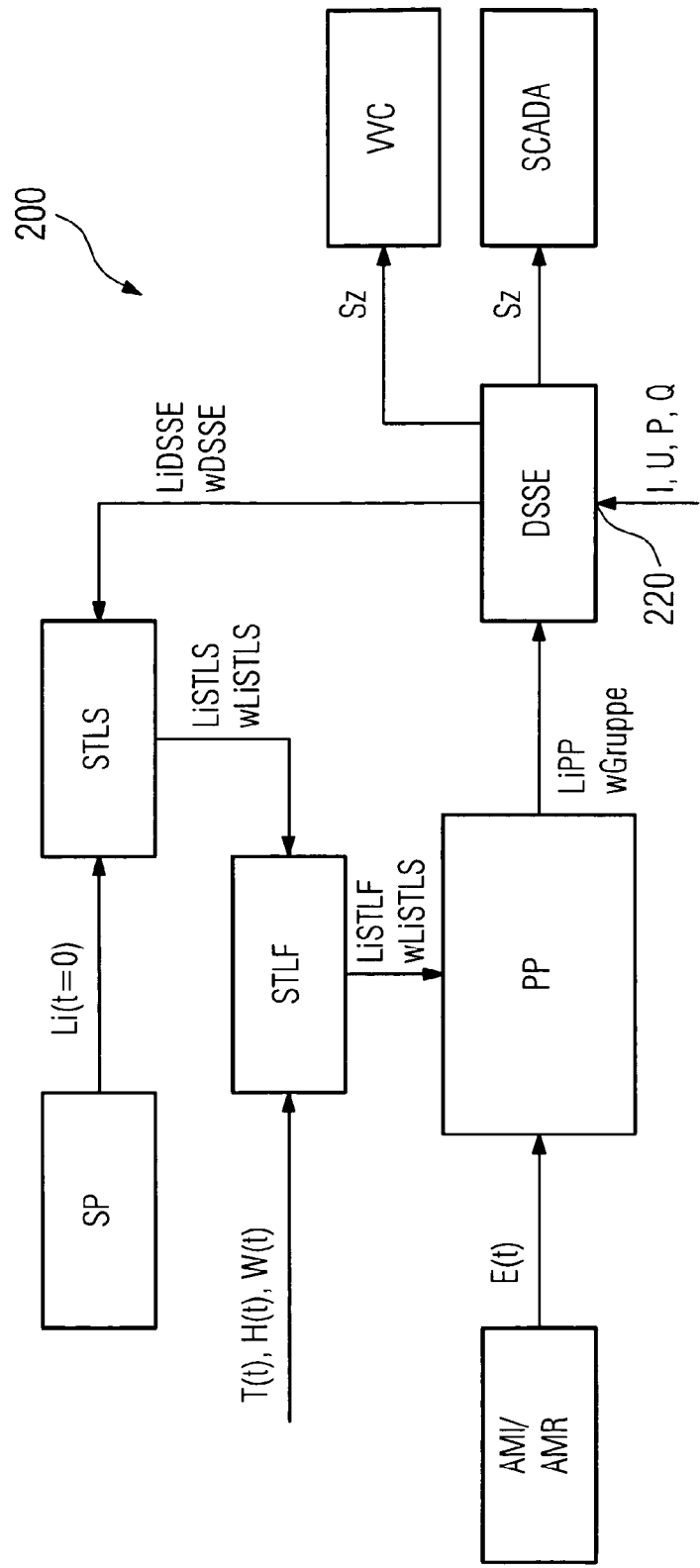

FIG. 7 shows a block diagram of the arrangement 200 with which a state signal can be created which indicates the state of an energy transmission system.

The arrangement 200 comprises a memory SP, in which load data Li(t=0) is stored. The load data Li describes an effective and/or no-load power P or Q tapped off on the operator side for the ith load which is connected to the energy transmission system.

Connected to the memory SP is a pre-processing device STLS, which can read the load data Li(t=0) out of the memory SP and process it. Provided no input values are yet present on the side of the estimation device DSSE, the pre-processing device will forward the load data Li(t=0) to a downstream correction device STLF. If however estimated load data LiDSSE from the DSSE is present, the pre-processing device STLS can decide whether to forward this data or the load data Li(t=0). For this purpose the pre-processing device STLS can check for example whether the prediction reliability, which is defined in the form of a weighting value or weighting factor wLiDSSE, exceeds a predetermined threshold or not. If the weighting factor wLiDSSE exceeds the threshold, the pre-processing device STLS will preferably forward the estimated load data LiDSSE to the downstream correction device STLF and if it does not it will forward the load data Li(t=0). The load data forwarded by the pre-processing device STLS is identified in FIG. 7 by the reference characters LiSTLS.

The pre-processing device STLS also forwards weighting values or weighting factors wLiSTLS which identify the prediction reliability of the forwarded load data LiDSSE.

The downstream correction device STLF checks whether the climatic assumptions underlying the forwarded load data LiSTLS are applicable. To this end it compares current measured climate values K(t) (e.g. temperature, humidity and/or wind strength values) with the climate values on which the forwarded load data LiSTLS is based and forms climate-coordinated load data LiSTLF. For example the correction device STLF applies a correction function f in accordance with:

$$LiSTLF = f(LiSTLS, T(t), T\_STLS, W(t), W\_STLS, H(t), H\_STLS)$$

Wherein the elements have the following meanings:
f is the climate correction function
T(t) is the current measured temperature
T_STLS is the temperature underlying the load data LiSTLS
H(t) is the current measured humidity
T_STLS is the humidity underlying the load data LiSTLS
T(t) is the current measured wind strength
T_STLS is the wind strength underlying the load data LiSTLS The correction function f can for example provide a product formed with a climate-dependent correction factor fSTLS in accordance with $$LiSTLF = LiSTLS * fSTLS(K(t))$$

To avoid a variation through the climate correction, the climate correction can additionally provide numerical smoothing, in that the climate values are averaged out over a predetermined period of time before the respective measurement time.

If at the time of the climate correction no current climate value, but for example only a climate value from the previous iteration step is available, this value can still be used for a correction. Preferably the respective age of the climate values is taken into account by an exponentially diminishing time factor ZF, which converges towards zero for a great age of the climate values. The time factor ZF can for example have the following form:

$$ZF(t)=\exp((t-t')/t\_ref),$$

Wherein t is the current time, t' is the time at which the climate value was recorded and t_ref is a predetermined diminishing constant.

The correction function f can for example appear as follows with such a time factor $$LiSTLF=LiSTLS*fSTLS(K(t))*ZF(t)$$

The correction device STLF forwards the climate-corrected load data LiSTLF to a post-processing device PP to which the energy consumption measurement devices AMI and AMR are connected. The energy consumption measurement devices AMI and AMR measure consumption values E(t) at predetermined network nodes and forward these values to the post-processing device PP. The post-processing device PP compares the consumption values E(t) with the climate-corrected load data LiSTLF and performs a correction if the climate-corrected load data LiSTLF deviates from the measured consumption values E(t). For example the post-processing device PP applies a correction function q1 or q2 to the climate-corrected load data LiSTLF and the weighting function wLiSTLS in accordance with:

$$LiPP=q1(LiSTLF,E(t))$$

$$wLIPP=q2(wLiSTLS,E(t))$$

Wherein the elements have the following meanings:
q1 is the correction function for the load data
q2 is the correction function of the weighting factors
LiPP is the corrected load data of the post-processing device and
wLIPP is the corrected weighting factors of the post-processing device.

After the corrected load data LiPP and the corrected weighting values wLIPP have been formed, the post-processing device PP assigns a respective electrical load group to the loads with the corrected load data LiPP, in which electrical loads with comparable prediction reliability are grouped together. To this end the post-processing device PP can for example include the corrected weighting values wLIPP and can assign all loads with similar weighting values wLIPP to the same load group in each case.

Usually industrial loads (e.g. factories, etc.) have a greater prediction reliability than private loads (private households), so that at least one load group is formed in each case for industrial loads and for private loads.

The corrected load data LiPP is subsequently fed in as "predicted load data", together with the weighting values wGruppe of the load groups, into the estimation device DSSE.

The estimation device DSSE, in addition to processing the load data LiPP and the weighting values wGruppe of the load groups, processes real measured electrical values, for example currently measured current values I, voltage values U, effective power values P and/or no-load power values Q.

The estimation device DSSE performs an estimation of the loads and an estimation of the power flow while including the data present on its input side, as has been extensively described in conjunction with FIGS. 1 to 6. In such cases, in addition to the predicted load data LiPP, it takes particular account of the weighting values wGruppe of the respective load group.

As part of the estimation new estimated load data LiDSSE and new estimated weighting values wDSSE are formed, which are transmitted to the pre-processing device STLS, so that as part of the iteration method a new iteration step can begin.

The estimation device DSSE creates a state signal Sz as part of the estimation or separately which indicates at least one state of the energy transmission system. The state signal can as a "state" indicates a current, voltage or power value at one of the network nodes of the energy transmission system, a measurement variable derived therefrom, a power flow and/or a low destination. An alarm signal which indicates an alarm state or an error signal which indicates an error can also be created as the state signal.

The state signal Sz can for example be further processed by downstream devices VVC and SCADA.

In FIG. 7 the pre-processing device STLS, the memory SP, the correction device STLF and the estimation device DSSE together form a control device 210 which is suitable for forming load groups, assigning loads to the load groups and allocating to each load group an individual weighting value which describes the prediction reliability of predicted load data of the loads assigned to the load group, and for checking the state of the energy transmission system with the inclusion of the measured values, the load data and also the weighting values and creating a state signal indicating the state.

The interface 220 is used for entering electrical measured values, which are measured for predetermined network nodes of the energy transmission system for at least one electrical measurement variable.

The invention claimed is:

1. A method of generating a state signal that indicates a state of an energy transmission system, the method which comprises:
   measuring electrical measured values for at least one electrical measurement variable for predetermined network nodes of the electricity transmission system;
   assigning to each electrical load connected to the energy transmission system predicted load data predicting an electrical behavior of the respective load;
   assigning each of the electrical loads to an electrical load group in which electrical loads with comparable prediction reliability are grouped together;
   assigning each load group a respective individual weighting value describing a prediction reliability of the predicted load data of the loads assigned to the load group; and
   generating the state signal by including the measured values, the load data and the weighting values, the state signal indicating the state of the energy transmission system.

2. The method according to claim 1, wherein:
   load groups of electrical loads for which at least one measured consumption value of at least one energy consumption measurement device is present and also further load groups for electrical loads for which no measured consumption value is present, are available; and
   the method comprises taking into consideration the prediction reliability and also a presence of a measured consumption value in the assignment of the electrical loads to one of the load groups.

3. The method according to claim 1, which comprises measuring at least one current climate measurement value and correcting the weighting values and/or the load data by including the current measured climate measurement values.

4. The method according to claim 3, which comprises effecting a correction if the current measured climate measurement value deviates from a predetermined nominal climate value.

5. The method according to claim 1, which comprises:
calculating simulated measurement variables by including the electrical measured values, the predicted load data and the weighting values for network nodes of the energy transmission system; and
checking the state of the energy transmission system by including the simulated measurement variables.

6. The method according to claim 5, which comprises calculating simulated measurement variables for the network nodes for which no electrical measured values are present.

7. The method according to claim 1, which comprises:
calculating simulated measurement variables for the predetermined network nodes for which electrical measured values are present;
comparing the simulated measurement variables to the predicted measured values; and
forming optimized load data by varying the predicted load data until the deviation between the simulated measurement variables and the electrical measured values becomes minimal or the value reaches or falls below a predetermined threshold.

8. The method according to claim 7, wherein the step of varying the predicted load data comprises taking into account the weighting values assigned to the respective load group by varying load data of which the weighting values indicate a lower prediction reliability in a greater range than load data of which the prediction value indicate a greater prediction reliability.

9. A device for generating a state signal that indicates a state of an energy transmission system, the device comprising:
an interface configured for input of electrical measured values that are measured for predetermined network nodes of the energy transmission system for at least one electrical measurement variable;
a control device connected to said interface and configured for forming load groups, assigning loads to the load groups and allocating a respective load group an individual weighting value that describes a prediction reliability of predicted load data of the loads assigned to the load group, and for checking the state of the energy transmission system by including the measured values, the load data and the weighting values and for creating a state signal indicating the state.

* * * * *